United States Patent [19]
Hedeson et al.

[11] Patent Number: 4,471,720
[45] Date of Patent: Sep. 18, 1984

[54] MODULUS BUILT ANIMAL CAGES

[75] Inventors: Lars M. Hedeson, Söderköping; Hans Fischer, Skara, both of Sweden

[73] Assignee: Perstorp AB, Perstorp, Sweden

[21] Appl. No.: 409,708

[22] Filed: Aug. 19, 1982

Related U.S. Application Data

[63] Continuation-in-part of Ser. No. 225,722, Jan. 16, 1981, abandoned.

[30] Foreign Application Priority Data

Jan. 18, 1980 [SE] Sweden ............................ 8000408

[51] Int. Cl.³ ............................................ A01K 31/16
[52] U.S. Cl. .................................. 119/17; 119/45 R; 119/48
[58] Field of Search ............................. 119/48, 17, 45

[56] References Cited

U.S. PATENT DOCUMENTS

| | | | |
|---|---|---|---|
| 2,264,959 | 12/1941 | Sperry et al. | 119/48 |
| 2,612,862 | 10/1952 | Ipsen | 119/18 |
| 3,256,860 | 6/1966 | Parker | 119/19 |
| 3,381,664 | 5/1968 | Barlocci | 119/17 |

FOREIGN PATENT DOCUMENTS

| | | |
|---|---|---|
| 1607086 | 7/1970 | Fed. Rep. of Germany . |
| 1757728 | 7/1972 | Fed. Rep. of Germany . |
| 2127369 | 4/1974 | Fed. Rep. of Germany . |
| 781400 | 2/1935 | France . |

Primary Examiner—Hugh R. Chamblee
Attorney, Agent, or Firm—Stevens, Davis, Miller & Mosher

[57] ABSTRACT

From separate bottom, wall and top units easily mountable and demountable modulus built cages for animals, including bottom units, side walls, back walls and top units. The cages are characterized in that the bottom units along their adjacent sides are provided with a first set of mounting means for mounting two bottom units together and a second set of mounting means for mounting the side walls on the bottom units, that the side walls at their vertical rear edges are provided with mounting means for the back walls, that the side walls are provided at the top with mounting means for the top units and that the side walls are provided at the bottom with mounting means intended to cooperate with the second set of mounting means on the bottom units.

11 Claims, 17 Drawing Figures

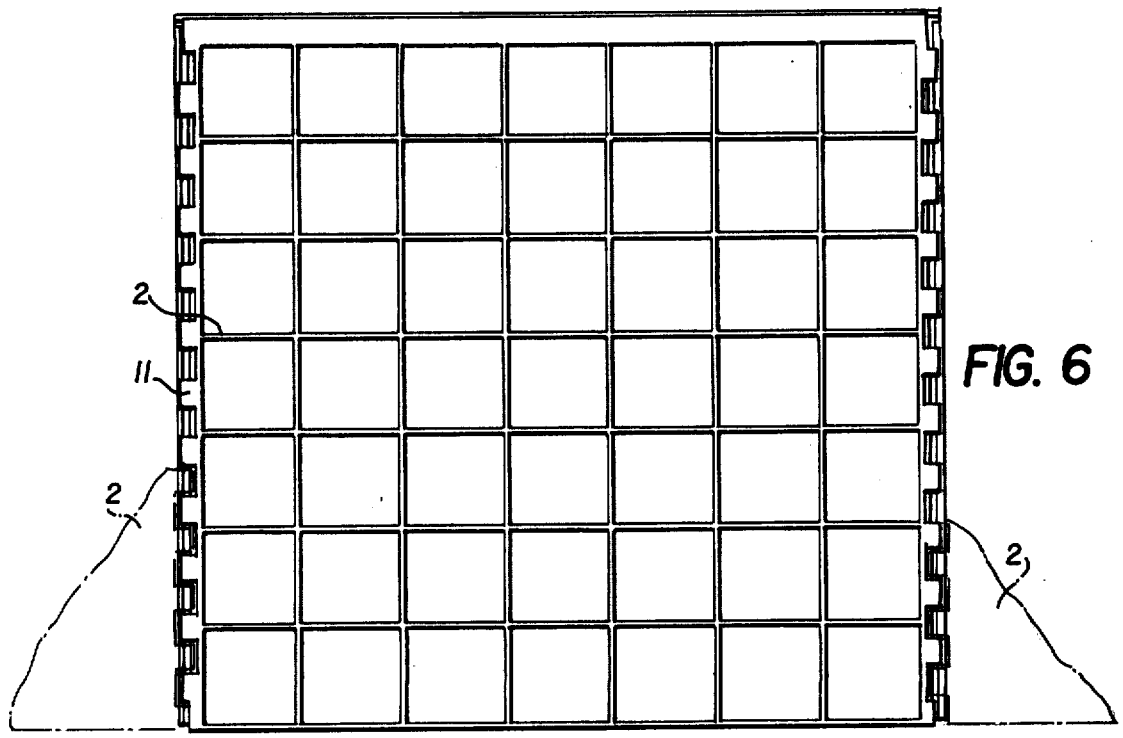
FIG. 6
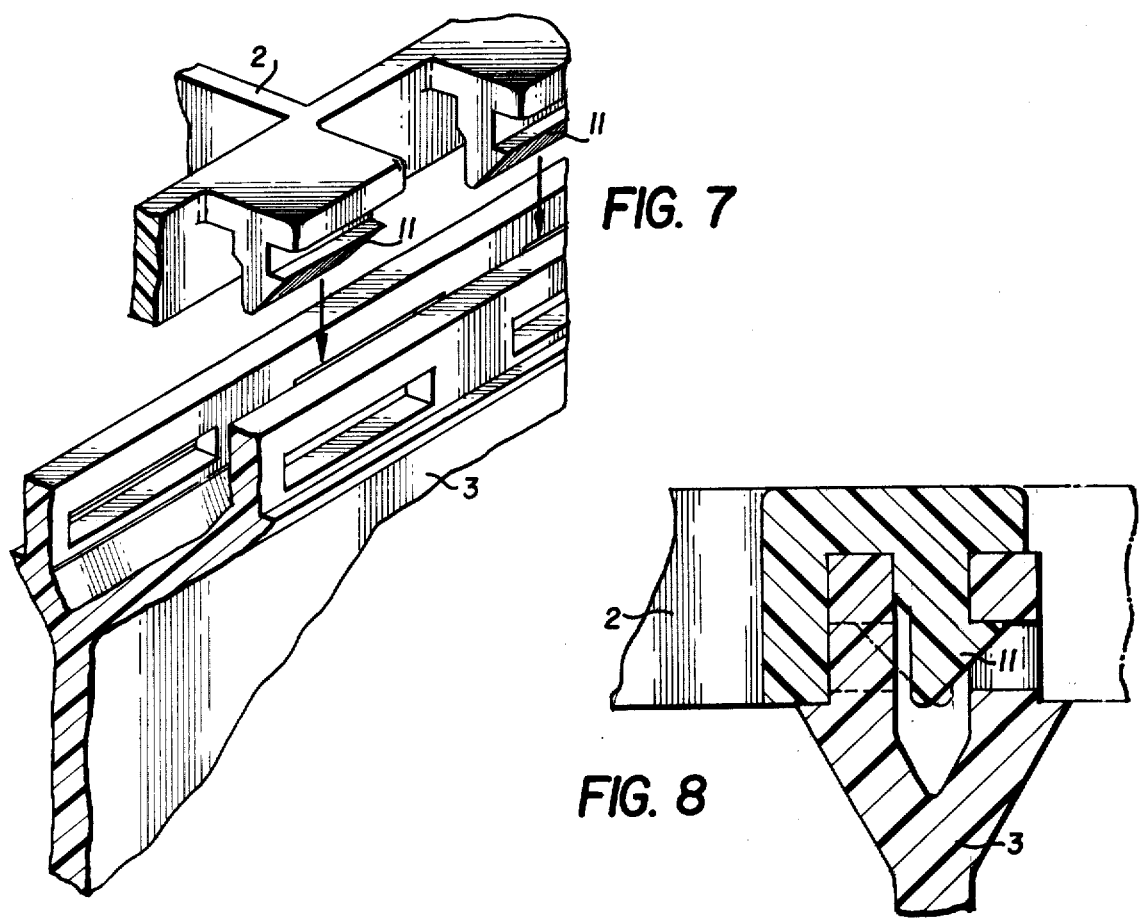
FIG. 7
FIG. 8

MODULUS BUILT ANIMAL CAGES

This is a continuation-in-part of application Ser. No. 225,722, filed 1/16/81, now abandoned.

BACKGROUND AND SUMMARY OF THE INVENTION

The present invention relates to modulus built cages for animals, which cages are easily mountable and demountable from separate bottom, wall and top units.

The cages are mainly intended for hens, especially laying hens. However, they can also be used for other animals.

The cages known before for this purpose are connected with several disadvantages. Thus, as a rule they do not give a wholly satisfactory environment for the animals. Moreover, it is time-consuming and thus very cost-consuming to mount the cages. Usually, it is also impossible to change parts of a broken cage in a row without demounting a great number of adjacent cages at the same time.

According to the present invention one has avoided to a great extent the above-mentioned problems with the cages known before and brought about, from separate bottom, wall and top units easily mountable and demountable modulus built cages for animals, including bottom units, side walls, back walls and top units.

The cages are characterized in that the bottom units along their adjacent sides are provided with a first set of mounting means for mounting the bottom units together and a second set of mounting means for mounting the side walls on the bottom units, that the side walls at their vertical rear edges are provided with mounting means for the back walls, that the side walls are provided at the top with mounting means for the top units and that the side walls are provided at the bottom with mounting means intended to cooperate with the second set of mounting means on the bottom units.

The first set of mounting means intended for mounting together the bottom units can suitably consist of hook like parts, which after the mounting are hooking to each other. However, it is also possible to mount the bottom units together in many other ways, on condition that a stable and strong construction is obtained.

The second set of mounting means on the bottom units that are intended for fixing the side walls can comprise longitudinal grooves for receiving outwards directed pins or flanges belonging to the mounting means at the bottom of the side walls. When the cages are intended for hens the bottom units are suitably openwork and check patterned. Then the squares can be perpendicular to the side walls. However, it is especially advantageous if the squares of the bottom units are arranged diagonally to the side walls. The hens are namely standing very well on such a bottom unit. Furthermore, the bottom units should be made of plastic and not metal. Metal conducts heat better than plastic. Therefore, if the bottom units are made of metal the hens are getting chilled to a great extent. If the hens are getting chilled, the fodder consumption will increase. In other words, the hens must eat more to keep their body temperature. Moreover, such a bottom unit made of plastic is adjusted to the environment.

If the cages are used for laying hens it is preferable that the bottom units are leaning forward and are provided with a shoot in the front part for receiving eggs.

The opening in the part of the cages is shut off for example by one or more gates, or doors.

Advantageously, the back walls are provided with stationary slats looking like venetian blinds. Then good ventilation is obtained by the slits between the slats. Moreover, by this construction of the back wall the animals will not have any possibility to hurt each other.

Not only the bottom unit but also the side walls, the back walls and the top units are suitably made of plastic, such as polyethylene or polypropylene.

Thereby, the cages are getting light, easy to clean and require a minimum of maintenance. However, if desired, there is nothing to prevent you from making one or more parts of metal or another material.

BRIEF DESCRIPTION OF THE DRAWINGS

FIG. 6 shows a perspective view of the top unit.

FIG. 7 shows the connecting means between a top unit and the top of a side wall.

FIG. 8 is a cross-sectional view of FIG. 17 at A—A.

DESCRIPTION OF THE PREFERRED EMBODIMENT

Figure 1:
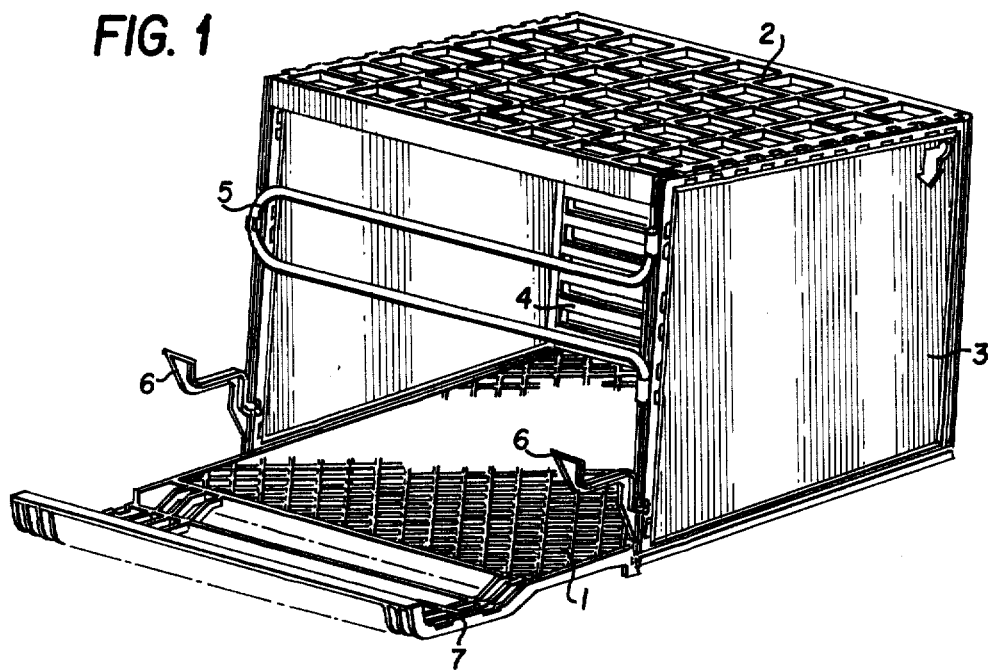
FIG. 1 shows a complete modulus of a cage with a gate and two supporting brackets at the opening of the cage.
Figure 2:
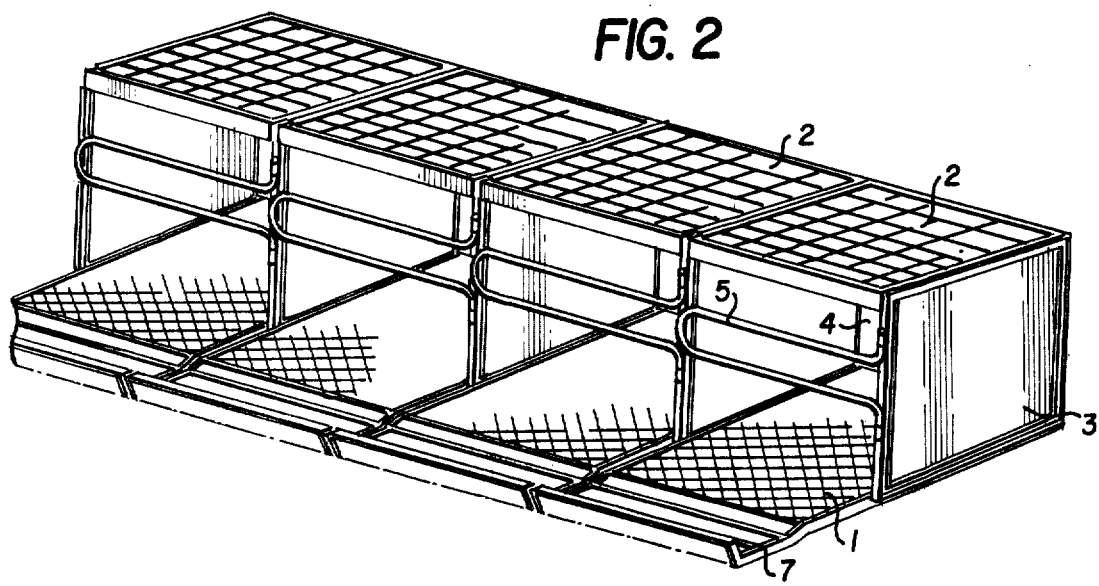
FIG. 2 shows a plurality of cages mounted in a row.
Figure 3:
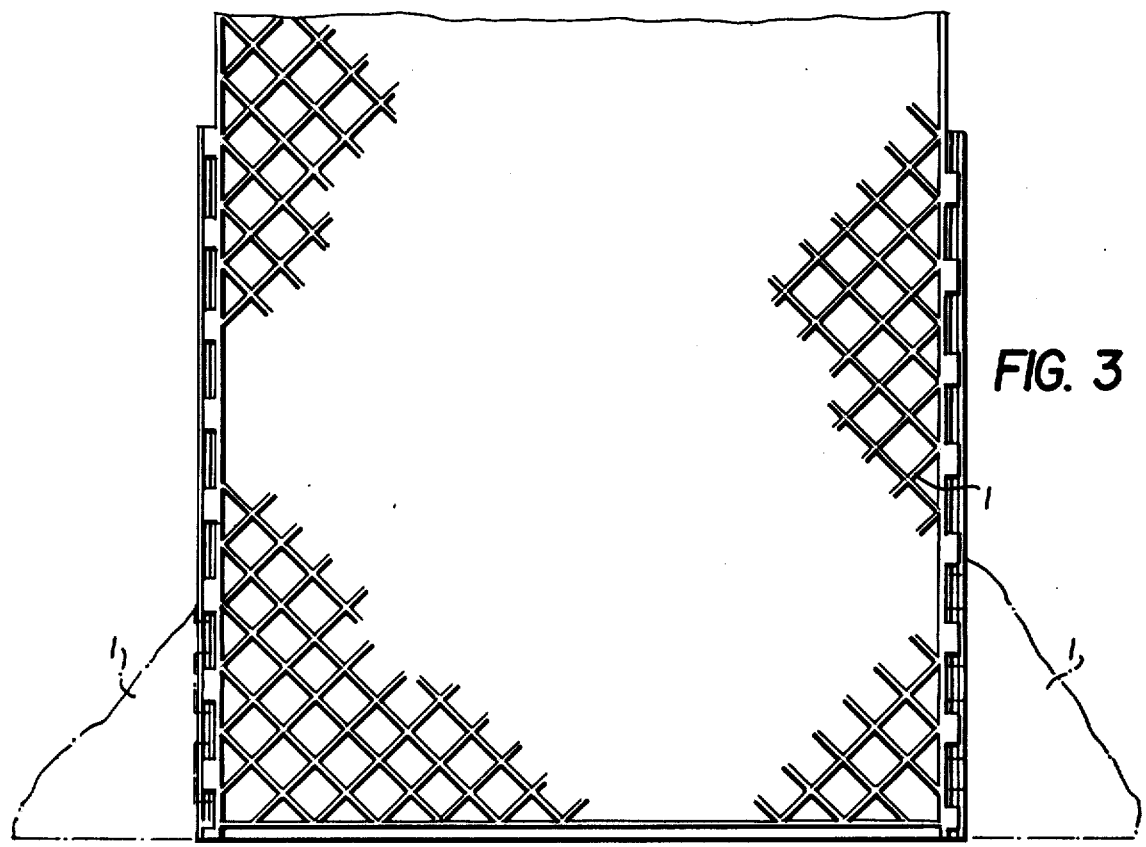
FIG. 3 shows a perspective view of the bottom unit.
Figure 4:
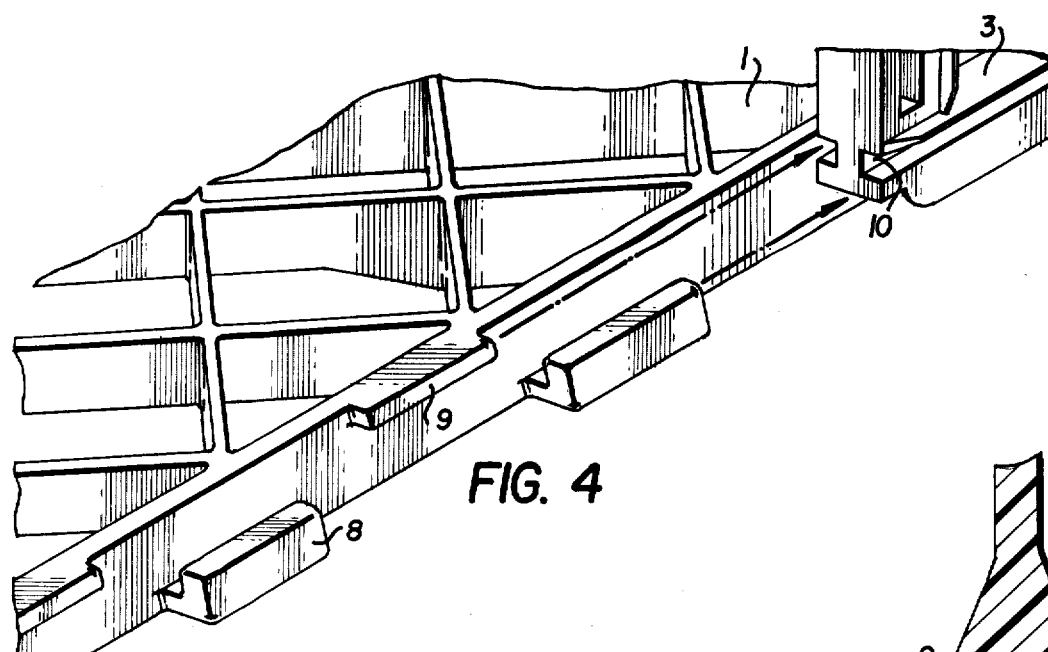
FIG. 4 shows the bottom unit with its two connecting means and a side wall with corresponding connecting grooves.
Figure 5:
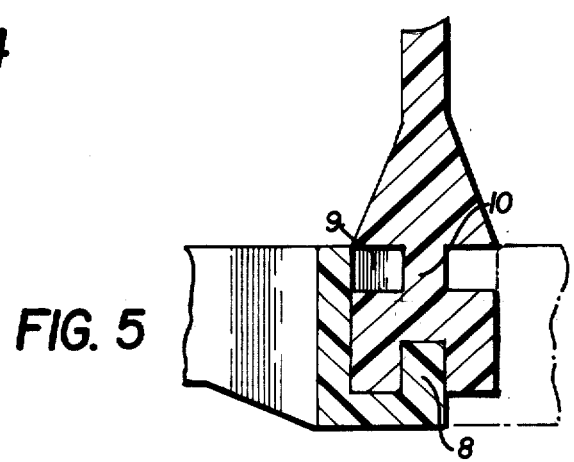
FIG. 5 shows a cross-sectional view of the connection between the bottom unit and side wall of FIG. 4.
Figure 9:
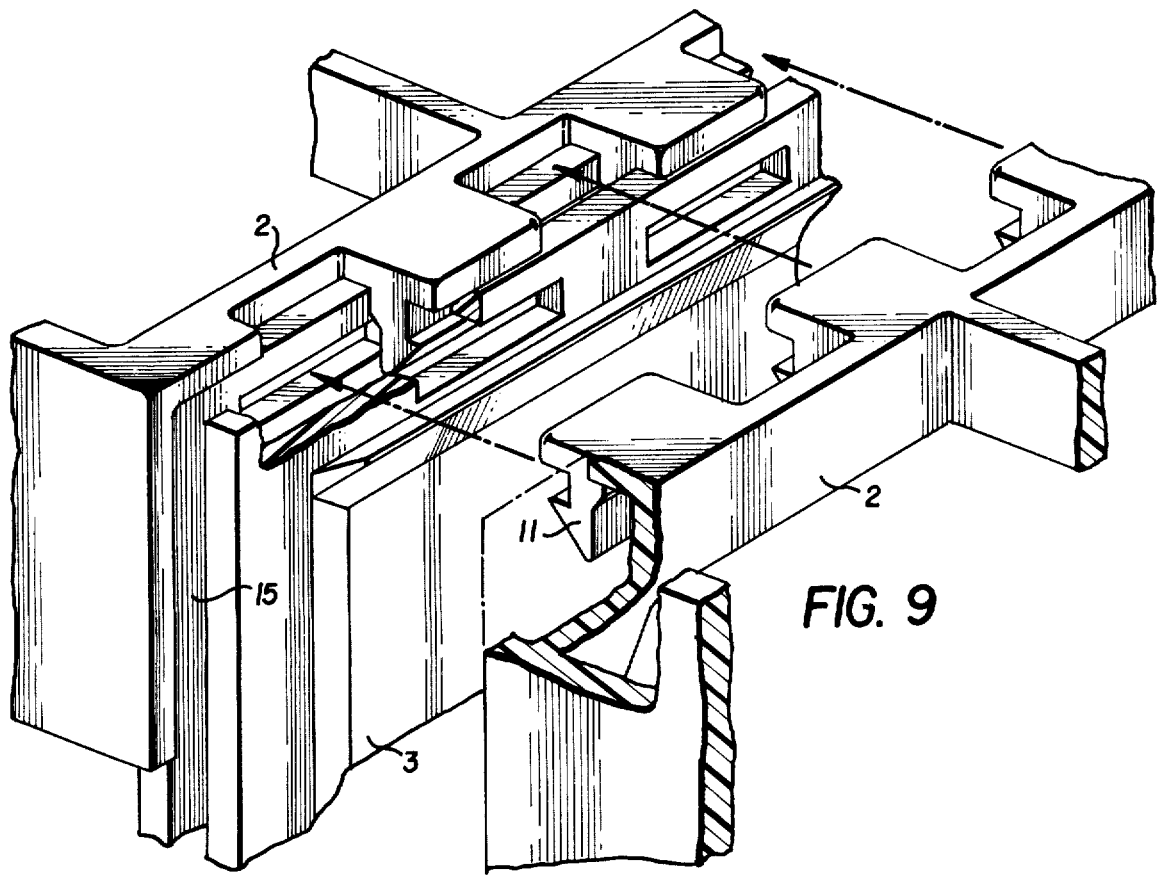
FIG. 9 is an exploded cross-sectional view of the connection between two top units and a side wall.
Figure 10:
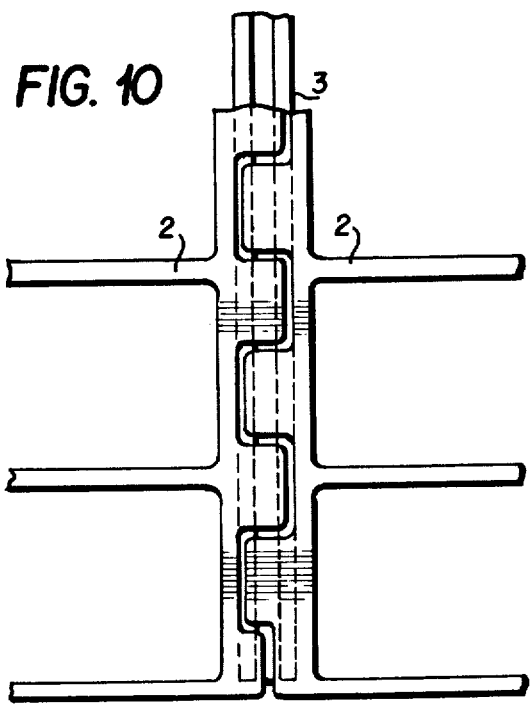
FIG. 10 shows the connection between two adjacent top units.
Figure 11:
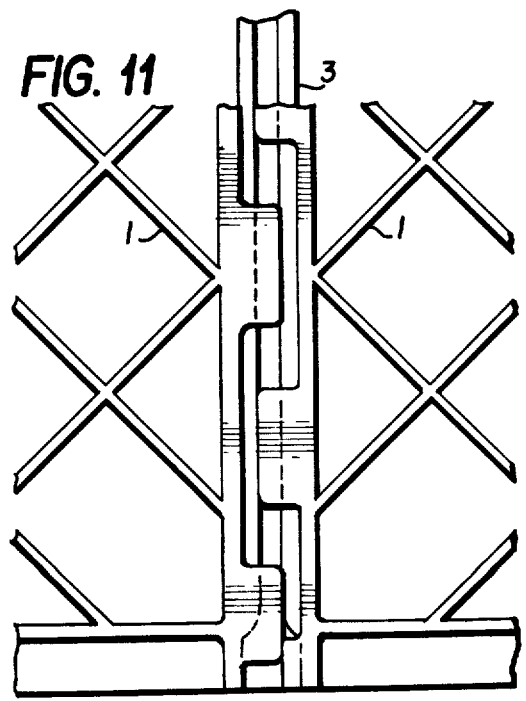
FIG. 11 shows the connection between two adjacent bottom units.
Figure 12:
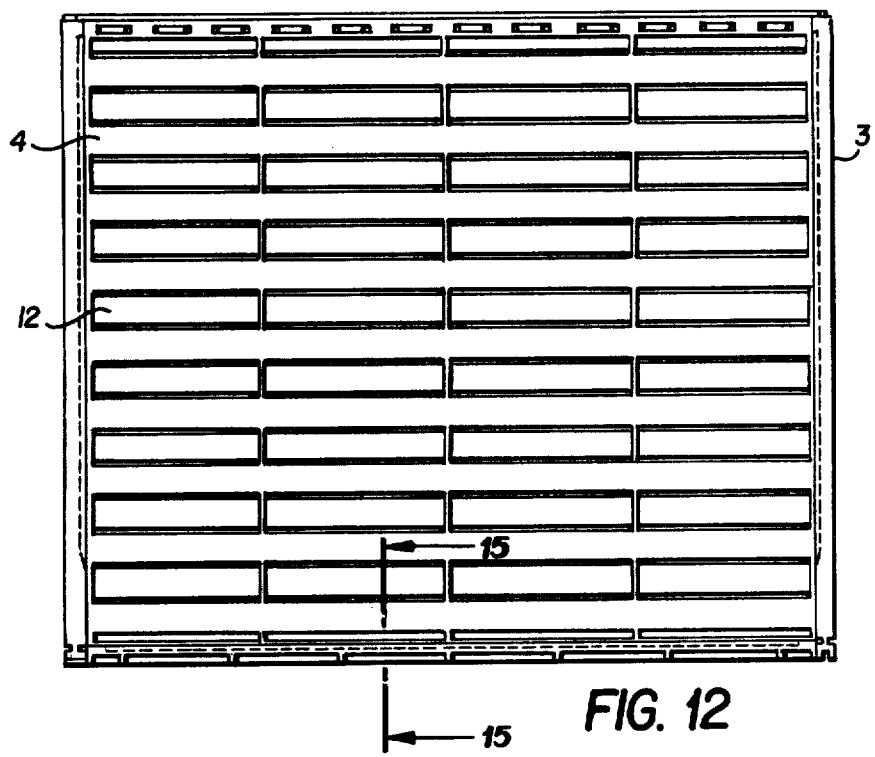
FIG. 12 shows a perspective view the back wall.
Figure 13:
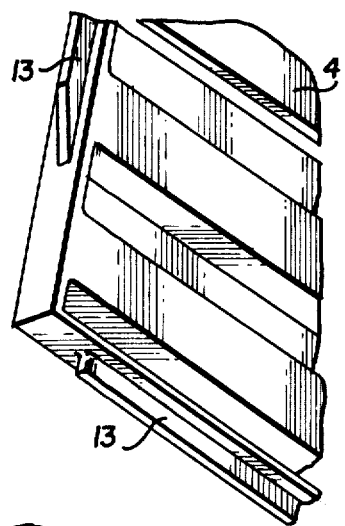
FIG. 13 shows a side view of the back wall with its corresponding connecting means.
Figure 14:
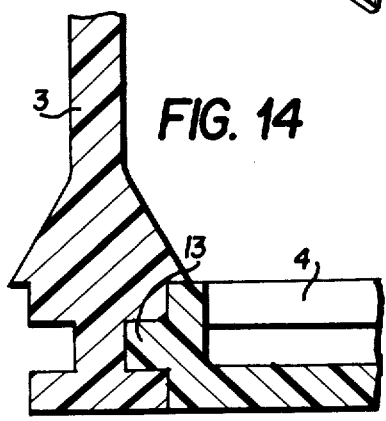
FIG. 14 shows a back view of the connection between the bottom far edge of a back wall and the back far edge of a bottom unit.
Figure 15:
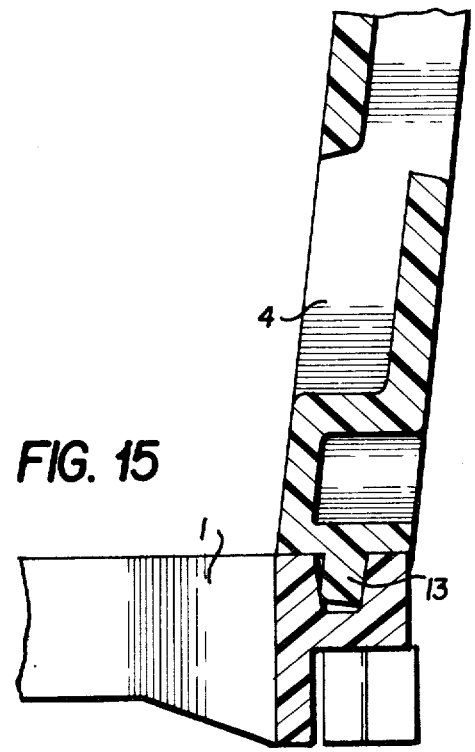
FIG. 15 shows a side view of the connection between the bottom edge of a back wall and the back far edge of a bottom unit.

The invention will be explained more in detail in connection with the accompanying drawings which show one embodiment according to the invention. FIG. 1 shows a complete modulus of a cage with a gate 5 and two support brackets 6. The cage comprises a bottom unit 1, side walls 3, a back wall 4, and a top unit 2. FIG. 2 shows a plurality of cages mounted in a row. The bottom units 1 of the module are mounted by pushing them together. In FIG. 11, two adjacent bottom units are shown connected together. FIG. 3 shows a partial drawing of the bottom unit. In FIG. 4, the bottom unit 1 comprises a first set of mounting means 8 consisting of hook-like parts, which are hooking to each other at the mounting of the side wall 3. At the mounting of the bottom unit a second set of mounting means 9 comprising longitudinal grooves between the bottom units are formed. Into these grooves the side walls are inserted. At the bottom of the side walls there is mounting means 10 comprising outward directed pins or flanges fitted for grooves. FIG. 5 shows a sectional view of the connection between the mounting means of the bottom unit and a side wall. The side walls at their vertical back edges comprises mounting means 15 for the back walls best shown in FIG. 9. These mounting means can be designed in different ways. For example, along the edges flanges or recesses can be arranged. Then the back wall can easily be pushed down to the correct position from above. Then a top unit is mounted on the side walls and back wall. Therefore, the side walls are provided with mounting means at the top. Advantageously, this can be arranged such that the top unit is fixed by snapping. FIG. 6 shows a top unit 2 with mounting means 11. FIG. 7 shows a top unit 2 with mounting means 11 and the corresponding connecting top of a side wall. FIG. 8 shows a sectional view of the snap connection between the top unit and the side wall. FIG. 9 shows how two adjacent top units 2 with their mounting means 11 are connected between a side wall 3. FIG. 10 shows a top view of the connection whereas FIG. 11 shows the corresponding connection between two adjacent bottom units 1. The back wall 4 shown in FIG. 12 is provided with stationary slats 12 looking like venetian blinds. FIG. 13 shows the side view of a back unit with connecting means 13. FIG. 14 shows a back view of the connection between a bottom far edge of the back wall and a back far edge of a bottom unit. FIG. 15 shows a side view of the connection between the bottom far edge of the back wall and the back edge of the bottom unit.

Figure 16:
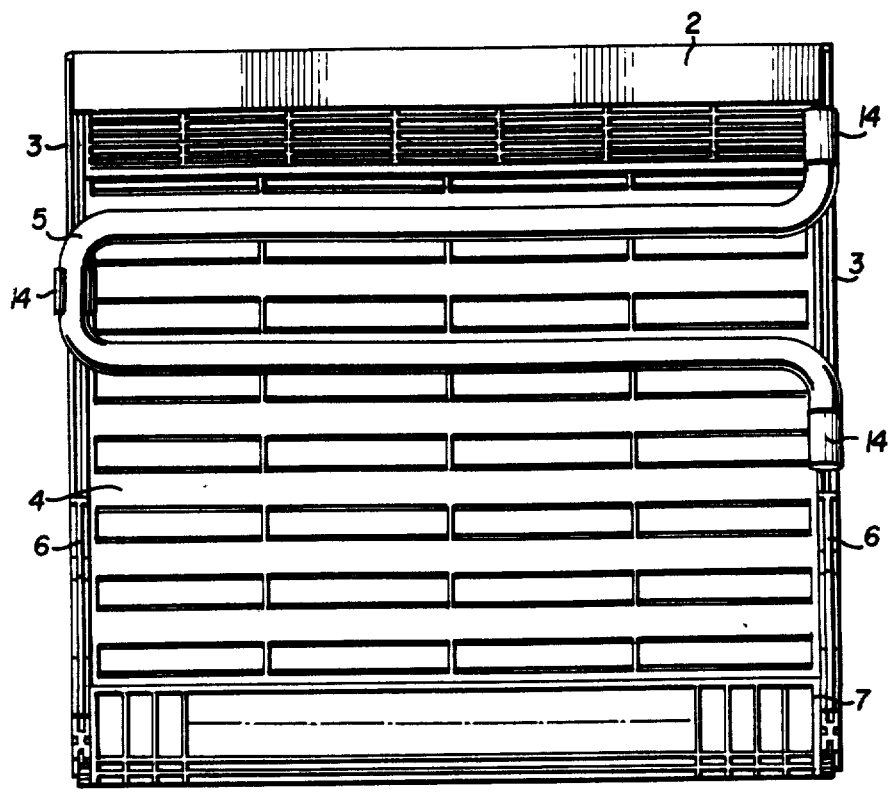
FIG. 16 is a front view of the cage.
Figure 17:
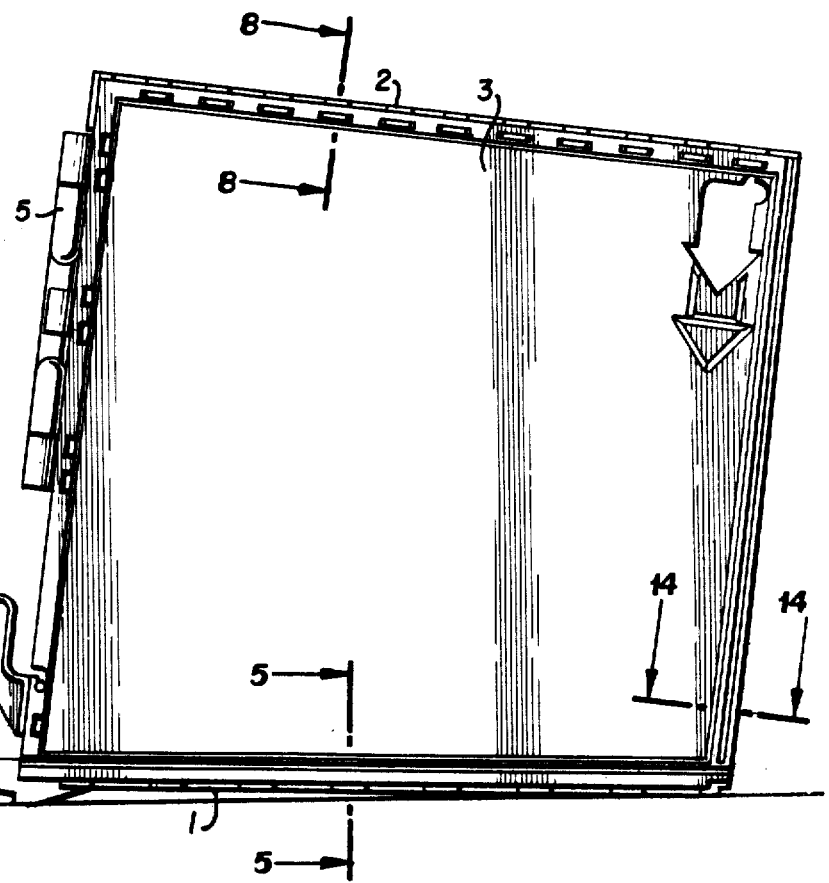
FIG. 17 is a side view of the cage.

In FIG. 16, the front opening of the cage is with a gate 5, and means for supporting the gate 14. Finally, FIG. 17 shows a side view with one of two supporting brackets 6 for holding, for example, a feeding tray. In this embodiment, the bottom unit 1 leans forward and comprises a shoot 7 for receiving eggs.

In the same way as described above, long rows of cages can rapidly be mnounted as shown in FIG. 2.

At a demounting the opposite order is used as a mounting. Mounting as well as demounting can be brought about quickly.

The present invention is not limited to the embodiment shown since this can be modified in different ways within the scope of the present invention.

What is claimed is:

1. A modulus built cage, said cage being easily mountable and demountable, said cage comprising:
    (a) a bottom unit, said bottom unit comprising a front edge, two side edges and a back edge, said side edges and said back edge comprising mounting means, said side edge mounting means comprising a series of vertically spaced hook-like projecting means on the lower edge of said side edge mounting means and a series of shorter projecting means projecting from the top edge of said side edge mounting means between said vertically spaced hook-like projecting means;
    (b) two sidewall units, each of said sidewall units comprising a bottom edge, a front edge, a top edge and a rear edge, said bottom edge of each of said sidewall units having slots provided therein to slidably receive said vertically spaced hook-like projecting means and said shorter projecting means, and said rear edge and said top edge comprising mounting means;
    (c) a backwall unit, said backwall unit comprising a top edge, two side edges and a bottom edge, wherein each of said backwall unit side edges comprise means adapted to connect said backwall unit to said sidewall units; and
    (d) a top unit, said top unit comprising a front edge, two sides edges and a rear edge, each of said top units side edges comprising means adapted to connect to sidewall top edge mounting means.

2. A modulus built cage according to claim 1, wherein said bottom unit is angled forward.

3. A modulus built cage according to claim 1 further comprising at least one gate, said at least one gate being in front of said cage.

4. A modulus built cage according to claim 1 wherein said back wall is provided with stationary horizontal slats for proper ventilation between the slats.

5. A modulus built cage according to claim 1, wherein said bottom unit is provided with a chute for receiving eggs.

6. A modulus built cage according to claim 1, wherein said bottom unit is open-work.

7. A modulus built cage according to claim 6, wherein the open-work comprises a series of hollow squares.

8. A modulus built cage according to claim 7, wherein said squares are arranged diagonally to said side wall units.

9. A modulus built cage according to claim 1, said cage being made of plastic.

10. A modulus built cage according to claim 9, wherein said plastic is selected from polyethylene and polypropylene.

11. A series of releasably interconnected modulus cages, each of said cages being easily mountable and demountable, each of said cages comprising:
    (a) a bottom unit, said bottom unit comprising a front edge, two side edges and a back edge, said side edges and said back edge comprising mounting means, said side edge mounting means comprising a series of first vertically spaced hook-like projecting means on the lower edge of said side edge mounting means and a series of shorter projecting means projecting from the top edge of said side edge mounting means between said vertically spaced hook-like projecting means;
    (b) two sidewall units, each of said sidewall units comprising a bottom edge, a front edge, a top edge and a rear edge, said bottom edge of each of said sidewall units having slots provided therein to slidably receive said vertically spaced hook-like projecting means and said shorter projecting means, and said rear edge and said top edge comprising mounting means;
    (c) a backwall unit, said backwall unit comprising a top edge, two side edges and a bottom edge, wherein each of said backwall unit side edges comprise means adapted to connect said backwall unit to said sidewall units; and
    (d) a top unit, said top unit comprising a front edge, two side edges and a rear edge, each of said top units sides edges comprising means adapted to connect to sidewall top edge mounting means, wherein the vertically spaced hook-like projecting means of the bottom unit of an adjacent cage are offset with respect to said first vertically spaced hook-like projecting means.

* * * * *